United States Patent Office 3,512,279
Patented May 19, 1970

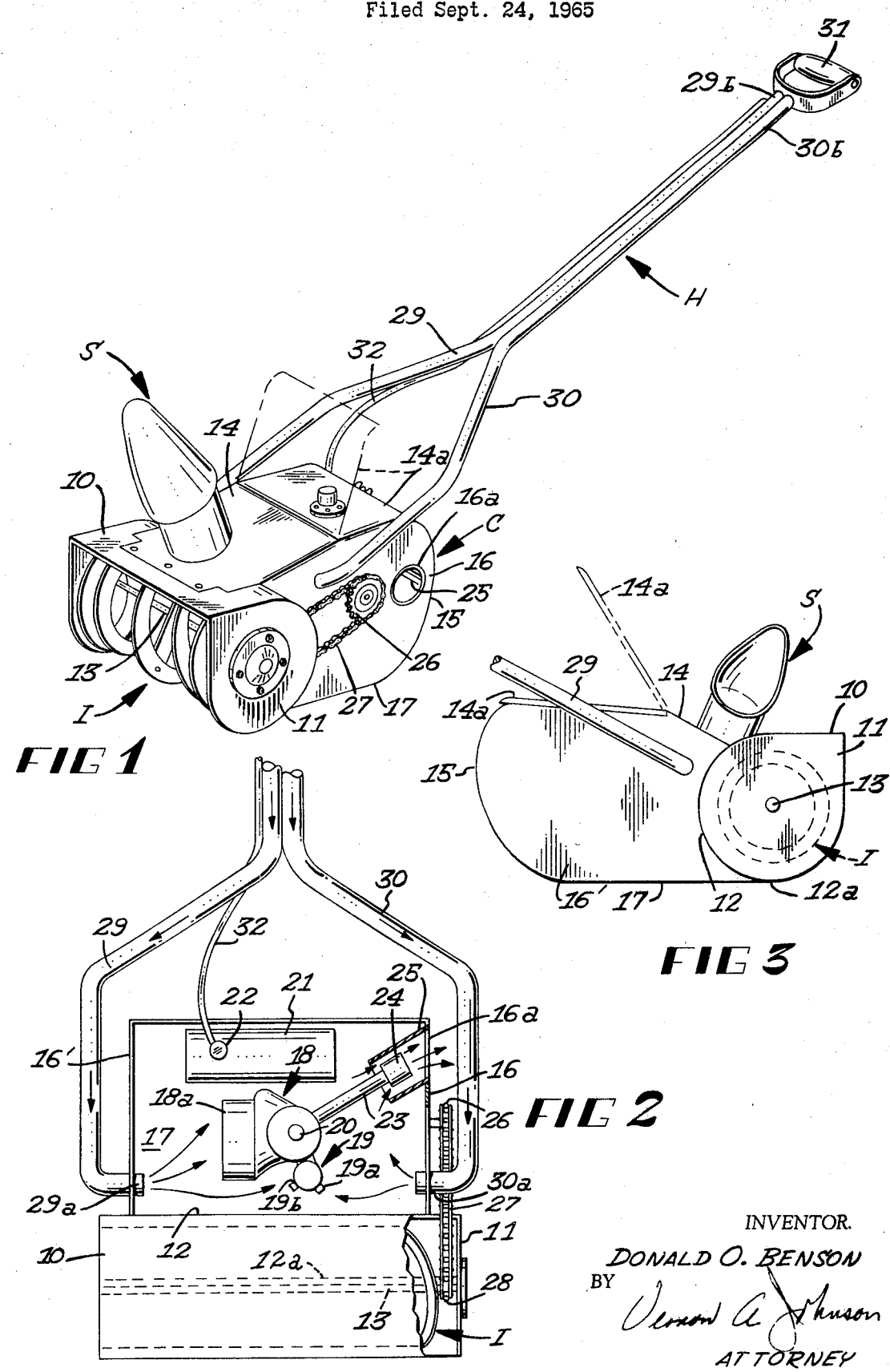

3,512,279
POWERED TOOL
Donald O. Benson, Minneapolis, Minn., assignor to Toro Manufacturing Corporation, Minneapolis, Minn., a corporation of Minnesota
Filed Sept. 24, 1965, Ser. No. 489,863
Int. Cl. A01d 35/24; E01h 5/09
U.S. Cl. 37—43                                                    13 Claims

ABSTRACT OF THE DISCLOSURE

A powered snow thrower having the power plant, including the engine, and the ignition and fuel systems, located near the impeller and completely enclosed and shielded from the snow. Air for cooling the engine and for carburetion is supplied through the steering handle from a point adjacent the handle grip. The fuel tank is vented to a point adjacent the handle grip. The power plant enclosure is aspirated by the engine muffler. The snow thrower is wheelless and is supported on a flat, plate like skid.

This invention relates to powered tools such as snow plows and lawn mowers which, during use, create a zone of air-borne particles which may interfere with the operation and cause malfunction of the power plant of said tool.

Conventional snow plows such as those used by homeowners for removing snow from sidewalks, driveways and the like, in which snow is picked up and blown some distance from the plow, and particularly those utilizing an air cooled gasoline engine, are subject to frequent malfunctioning caused by blowing snow entering the engine intake, cooling and ignition and fuel systems causing stoppage of the engine. Similar problems are encountered by lawn mowers powered by gasoline engines, particularly those of the rotary type, in which the clippings and/or dust raised by the mower encounter the engine components and cause clogging and stoppage thereof.

Therefore, one object of this invention is to provide a power tool of the type described in which the power plant is shielded from said air-borne particles and is supplied with operational air from a remote source located outside the zone of air-borne particles.

Another object is to provide an ambulatory type ground traversing power tool of the type described, including snow plows and lawn mowers, having a power plant shielded from said particles, a handle for steering said tool, and a remote source of operational air for said power plant carried by said handle which draws the air from an area outside said zone of particles, such as the area adjacent the upper end of the handle.

Another object is to provide an ambulatory ground traversing power tool of the type described, including snow plows and lawn mowers, having a power plant shielded from said particles, and a handle for steering said tool, said handle including in its formation one or more tubular members which serve as the means for conveying operational air from a remote source to the power plant.

Still another object is to provide a relatively small, wheelless, lightweight, easily handled, snow throwing snow plow having a powered snow impeller and a flat plate beneath said impeller for supporting and controlling said plow, which plate also permits gradual shaving down of deep drifts of snow with minimum effort on the part of the operator.

These and other objects and advantages of the invention will more fully appear from the following description made in connection with the accompanying drawings wherein like character references refer to the same parts throughout the several views, and in which:

FIG. 1 is a perspective view of a snow plow constituting one embodiment of this invention, FIG. 2 is a top plan view of the snow plow of FIG. 1 with portions removed and broken away for clarity, and FIG. 3 is a side elevational view of the snow plow of FIG. 1 as viewed from the right side thereof.

The illustrated snow plow includes a rotor or impeller I of the rotatable auger type which augers the snow from both of its ends towards the center thereof, and which then impels the snow upwardly through a directionally controllable snow discharge chute S which selectively throws the snow to either side of the plow, an enclosed housing or compartment C located directly behind the impeller for housing the power plant and shielding the same from drifted and blowing snow, and a handle assembly H, the lower end of which is attached to compartment C for steering and manipulating the plow.

The rotor or impeller I is partially enclosed by a rotor housing which includes a top wall 10, a pair of spaced apart opposed side walls 11, which support the shaft 13 of the rotor, and a concavely curved substantially semi-circular back wall 12 extending between side walls 11 and having an upwardly directed opening located centrally thereof and communicating with the discharge chute S. The lower leading end of the back wall 12 terminates in a straight edge or skid portion 12a which is located almost directly beneath the rotor shaft 13 and extends the full width of the rotor housing between the side walls 11 thereof. Thus, the back wall 12 serves as a circularly shaped back scoop which corrects the snow and which is scavenged by the auger so as to remove the snow therefrom and impel same upwardly to and through the chute S.

The housing or compartment C for the power plant is substantially completely closed so as to provide an area or plenum chamber for the power plant which is completely protected and shielded from any blowing or drifting snow. Compartment C includes a top wall 14 which includes a hinged access cover 14a, a curved back wall 15, a pair of side walls 16–16' and a flat bottom wall or plate 17 which serves to support the plow on the ground or other supporting surface. The front end of compartment C is closed by the back wall 12 of the rotor housing to which the walls of compartment C are rigidly secured. There is no communication between compartment C and the rotor housing so that no snow can enter therefrom. The bottom wall 17 is disposed below the rotor and maintains the rotor in spaced relation above the surface being cleaned so that the rotor will not engage same. In the illustrated embodiment, the leading end of the bottom wall 17 is joined to and merges with the straight edge or skid portion 12a. For best results, the leading edge of the supporting bottom plate 17 is located beneath or rearwardly of the rotor shaft. The bottom wall 17 provides a smooth continuous plow supporting surface which enables the plow to slide easily over the surface being cleaned or ride smoothly and easily on snow when deep drifts are progressively shaved with a minimum of effort on the part of the operator.

The power plant for the snow plow is completely enclosed within compartment C. Mounted in compartment C is an air-cooled gasoline engine 18 having a diaphragm type air vented carburetor 19, said carburetor having an air intake 19a for carburetion (engine breathing) and an air vent 19b. Also housed within compartment C is the ignition system for the engine including the spark plug 20 and the fuel system for the engine including the fuel tank 21 having a conventional vented cap 22. The engine is provided with an exhaust manifold 23 having an exhaust muffler 24 also located within the confines of compartment C which is adapted to exhaust the exhaust gases from the engine from the compartment C through an opening 16a provided in side wall 16 thereof.

A generally cylindrical shroud 25 encloses the exhaust muffler and is so designed to prevent raw fuel from entering the closed engine compartment C, said shroud being so designed as to cause any raw fuel from the muffler to drain overboard or outwardly of the compartment C through opening 16a when the plow is in its normal starting or operating position. The shroud 25 extends inwardly from side wall 16 and encloses opening 16a and is spaced from the muffler a sufficient distance to provide an annular space between the muffler and shroud to permit air in compartment C to escape therefrom between the muffler and the shroud, the air in compartment C being aspirated or drawn therefrom by the action of the exhaust gases being discharged from the muffler through the shroud and opening 16a.

To drive the rotor, a drive sprocket 26 driven by the engine (and operatively connected therewith by means not shown) is mounted outwardly of side wall 16 of compartment C, said sprocket being drivingly connected to the rotor by means of a drive chain 27 extending between said drive sprocket and a driven sprocket 28 carried by the rotor shaft.

In the illustrated embodiment, the handle assembly H serves as the means for supplying operational air to compartment C from a remote source. The handle assembly H includes a pair of elongate tubular members 29 and 30 which at their upper ends are disposed in side by side relationship, and which, at their lower ends, are bent outwardly and forwardly to provide a yoke or fork formation. The extreme lower end portions of the tubes 29 and 30 are bent inwardly as at 29a and 30a, respectively, and are pivotally connected to their respective side walls 16–16' of the engine compartment C so as to provide a steering connection between the handle assembly and the engine compartment. These lower end portions 29a and 30a extend into the engine compartment and are open at their inner end so as to admit air from a remote source to the compartment. The upper end portions 29b and 30b of the tubes 29 and 30 are open and are interconnected by means of a handle grip 31, the open upper ends of said tubes serving as the air intake openings for said tubes to permit the operational air to be drawn from a remote source adjacent the outer end of the handle assembly and from an area outside the zone of air-borne particles created by the plow.

The engine must have sufficient air for breathing (carburetion) and cooling thereof, and in the illustrated embodiment the needed carburetion and cooling air are drawn directly from the plenum chamber defined by compartment C, said air being supplied to said chamber from a remote source through handle tubes 29 and 30, which draw the clean air in at their upper ends 29b and 30b and discharge it into said chamber from their lower ends 29a and 30a. The carburetion air is drawn into the engine from the plenum of compartment C through the carburetor air intake 19a, and the cooling air is drawn from said plenum by the engine cooling fan 18a. If desired, the carburetion air can be supplied directly to the carburetor from one of the handle tubes, rather than being drawn from the plenum of compartment C, such as by connecting the air intake 19a and the lower end portion 30a of handle tube 30 by means of suitable tubing (not shown). It will also be noted that the discharge mouth of lower end portion 29a of tube 29 is in close proximity to the engine cooling fan 18a, so that incoming air from 29a is supplied directly to said fan, and made immediately available thereto.

Since the particular carburetor illustrated must be vented its air vent 19b also communicates directly with the plenum of compartment C, so that the carburetor is vented into the plenum of compartment C. Thus, only cool, snow free air is supplied to the engine and carburetor.

With regards to the fuel tank, when the tank is appreciably filled and the engine is running, there is a tendency for the fuel in the tank to foam and to spill out of the vent in the cap 22. It is, of course, undesirable to have raw fuel or fuel vapors within the engine compartment plenum and therefore the air vent of cap 22 is provided with flexible tubing 32 which extends out of compartment C through a suitable aperture provided therefor, said tubing being attached to and supported by handle tube 29, with the outer end of said tube being located adjacent the upper end of the handle, so that the fuel tank is vented out of the engine compartment and connected to a remote source of clean air. The tube 32 also prevents spillage of fuel from the tank if the plow is tilted during use, and enables the plow to be hung up by the handle for storage purposes without spillage of any fuel remaining in the tank, since the tube 32 remains generally upright during normal usage and storage.

Thus, the entire power plant including the gasoline engine, the ignition system therefor, and air vented carburetor and fuel tank are all completely enclosed by compartment C and completely shielded from any blowing or drifted snow. The compartment surrounding the engine, the carburetor and the fuel tank obtain clean air from a remote source adjacent the top of the handle and the exhaust gases are utilized to aspirate the compartment C. In this manner, snow is precluded from coming in contact with the engine and the ignition system, and is prevented from entering the carburetor and fuel tank. This arrangement not only prevents engine malfunctioning due to blowing snow, but also enables the entire lower end portion of the plow, including the power plant, to become completely imbedded in a mass of snow without having snow contacting the power plant and enabling the engine to continue to operate.

The fuel tank may, if desired, be located in a separate compartment from the engine and connected by suitable tubing to a remote source of air, it may be mounted in an area outside the zone of blowing snow such as on the upper end portion of the handle assembly, or it may simply be mounted outside the compartment C within the zone of blowing snow and be connected by suitable tubing to a remote source of air. The air intake openings for the tubes 29 and 30 do not necessarily have to be at the extreme upper ends of the tubes. Said air intake openings can be formed anywhere along the length of the tubes 29 and 30 so long as they are located outside the zone of blowing snow. Also, the handle itself does not necessarily have to serve as the source of air, since separate tubing can be mounted thereon which is in communication with the engine compartment, and which as air intake opening outside the zone of blowing snow.

It will also be apparent that the inventive principles described hereinbefore as applied to the illustrated snow plow are also equally applicable to other power driven tools which create a zone of air-borne particles thereabout, including other ambulatory ground traversing tools such as lawn mowers wherein the engine, ignition system, and fuel system can be shielded from air-borne clippings and dust raised by the mower in an enclosed compartment as illustrated, and can be supplied with a remote source of air by tubular means carried by or forming a part of the handle assembly.

It will, of course, be understood that various changes can be made in form, details, arrangement and proportions of the various parts without departing from the scope of this invention.

What I claim is:

1. An ambulatory type ground traversing power source for driven tools, including snow plows and lawn mowers, comprising:

an enclosed compartment, an air-cooled gasoline engine, and carburetor for said engine all enclosed within said compartment, handle means for steering said tool, said handle means including a pair of rigid elongate tubes, the lower ends of said tubes being attached to opposite sides of said compartment and extending into same and adapted to supply cooling air to said engine and carburetion air to said carburetor, the upper end portions of said tubes having air intake openings adapted to draw air from an area substantially remote from said compartment, and means for aspirating air from said compartment.

2. The tool of claim 1, including a fuel tank for said engine within said compartment, and means for venting said fuel tank outside said compartment.

3. The tool of claim 1, wherein said aspirating means includes an opening formed in said compartment, and an exhaust manifold provided with a muffler adapted to discharge the engine exhaust gases through said opening in such fashion that the engine exhaust gases draw air from said compartment through said opening.

4. A power source for a driven tool comprising:

a housing defining a substantially completely enclosed compartment, said compartment completely enclosing therewithin an air cooled gasoline engine and an ignition system, carburetor, air vented fuel tank and exhaust muffler for said engine, handle structure for steering said tool including a pair of elongate hollow tubes extending upwardly and rearwardly from said housing, the upper end portions of said tubes being open for receiving air, the lower end portions of said tubes being pivotally connected to opposite sides of said housing and adapted to deliver said air taken into said tubes at the upper end portions thereof to said compartment, tubular means connected to the air vent of said fuel tank and extending through said housing and supported by said handle structure and communicating with atmosphere at a point adjacent the upper end portion of said handle structure, an exhaust opening formed in said housing, a tubular shroud connected to said housing surrounding said exhaust opening and extending inwardly therefrom into said compartment, said shroud enclosing said muffler and communicating with said compartment whereby the exhaust gases from said engine are exhausted to atmosphere through said muffler, shroud and exhaust opening and whereby said compartment is aspirated by the exhaust action of said exhaust gases.

5. The device of claim 4, including:

a snow collecting housing located immediately forwardly of said first named housing, snow gathering impelling means mounted in said snow collecting housing and driven by said engine, and chute means for receiving the snow from said impelling means and directing it away from said tool.

6. The device of claim 5, wherein said housings have a common generally upstanding wall, said wall being transverse to the direction of travel and arcuate in cross section with the concave side thereof facing forwardly, the snow collected by said impelling means traveling upwardly along the concave forward face of said wall to said chute means.

7. The device of claim 6, wherein said first named housing includes a horizontal bottom wall which supports the tool on the tool supporting surface.

8. The device of claim 7, wherein said impelling means rotates about a horizontal axis transverse to the direction of travel, and wherein the leading edge of said bottom wall does not extend forwardly of said axis.

9. The device of claim 7, wherein the leading edge of said bottom wall is co-terminous with the lower leading edge of said arcuate wall.

10. An ambulatory type ground traversing power source for a driven tool, including snow plows and lawn mowers comprising:

an enclosed compartment, an air cooled gasoline engine enclosed within said compartment and completely shielded thereby from airborne particles surrounding said compartment, handle means for steering said tool, said handle means including a pair of rigid elongate members attached to opposite sides of said compartment, at least one of said members being tubular and having a lower end extending into said compartment adapted to supply cooling air to said engine, said tubular member also having an upper end portion, and an air intake opening in said upper end portion remote from said compartment.

11. The tool of claim 10, wherein said members are pivotally attached to said compartment for pivoted movement about a horizontal axis transverse to the normal direction of travel.

12. The tool of claim 10, wherein both of said members are tubular, each of said members having an upper end portion with an air intake opening therein remote from said compartment for admitting air to the respective member and a lower end portion extending into said compartment for supplying said air to said engine.

13. The tool of claim 12, wherein said members are pivotally attached to said compartment for pivoted movement about a horizontal axis transverse to the normal direction of travel.

References Cited

UNITED STATES PATENTS

| | | |
|---|---|---|
| 1,709,243 | 4/1929 | Wolters. |
| 2,207,447 | 7/1940 | Viles et al. _____ 123—41.64 X |
| 2,408,459 | 10/1946 | Tuttle. |
| 2,597,774 | 5/1952 | Britten _____ 56—25.4 |
| 2,616,553 | 11/1952 | Joy _____ 37—43 X |
| 2,815,742 | 12/1957 | Kiekhaefer. |
| 3,110,997 | 11/1963 | McClain _____ 56—25.4 |
| 3,115,714 | 12/1963 | Johann. |
| 3,199,235 | 8/1965 | Stacey _____ 37—43 |
| 3,157,211 | 11/1964 | Wiig _____ 143—32 |
| 2,597,735 | 5/1952 | Jepson _____ 56—26 |
| 2,623,308 | 12/1952 | Lamy. |
| 2,714,772 | 8/1955 | Erickson. |
| 2,730,084 | 1/1956 | Stegeman _____ 56—26 X |

ROBERT E. PULFREY, Primary Examiner

A. E. KOPECKI, Assistant Examiner

U.S. Cl. X.R.

37—40; 56—25.4; 123—41.64

UNITED STATES PATENT OFFICE
CERTIFICATE OF CORRECTION

Patent No. 3,512,279　　　　　　　　　　　　　　May 19, 1970

Donald O. Benson

It is certified that error appears in the above identified patent and that said Letters Patent are hereby corrected as shown below:

Column 2, line 33, "corrects" should read -- collects --.

Signed and sealed this 29th day of December 1970.

(SEAL)
Attest:

Edward M. Fletcher, Jr.　　　　　　　　　WILLIAM E. SCHUYLER, JR.
Attesting Officer　　　　　　　　　　　　　　Commissioner of Patents